US011243852B2

(12) United States Patent
Kedia et al.

(10) Patent No.: US 11,243,852 B2
(45) Date of Patent: *Feb. 8, 2022

(54) ACL BASED OPEN TRANSACTIONS IN REPLICATION ENVIRONMENT

(71) Applicant: International Business Machines Corporation, Armonk, NY (US)

(72) Inventors: Pravin K. Kedia, Mumbai (IN); Nirmal Kumar, Bangalore (IN); James D. Spyker, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 236 days.

This patent is subject to a terminal disclaimer.

(21) Appl. No.: 16/660,857

(22) Filed: Oct. 23, 2019

(65) Prior Publication Data
US 2020/0057698 A1 Feb. 20, 2020

Related U.S. Application Data

(63) Continuation of application No. 15/805,194, filed on Nov. 7, 2017, now Pat. No. 10,540,243, which is a (Continued)

(51) Int. Cl.
*G06F 17/00* (2019.01)
*G06F 11/14* (2006.01)
(Continued)

(52) U.S. Cl.
CPC ...... *G06F 11/1474* (2013.01); *G06F 11/1458* (2013.01); *G06F 11/1471* (2013.01);
(Continued)

(58) Field of Classification Search
CPC .... G06F 16/273; G06F 16/2379; G06F 16/27; G06F 11/1458; G06F 11/1471; G06F 11/1474
See application file for complete search history.

(56) References Cited

U.S. PATENT DOCUMENTS 5,737,601 A    4/1998 Jain
6,044,374 A *  3/2000 Nesamoney .......... G06F 16/283
(Continued)

OTHER PUBLICATIONS

IBM, "List of IBM Patents or Patent Applications Treated as Related", Appendix P, 2 pages, dated Oct. 23, 2019.

*Primary Examiner* — Hasanul Mobin
(74) *Attorney, Agent, or Firm* — William H. Hartwell

(57) ABSTRACT

A method, computer program product, and computer system for handling open transactions in a data replication environment is provided. The method includes determining a database user that initiated an earliest open transaction in a transaction log. The method further includes, upon determining that the database user does not have access privileges for one or more tables of a target database corresponding to one or more tables of a source database associated with the earliest open transaction, skipping replication of the earliest open transaction to the target database, such that the data replication system no longer waits for the earliest open transaction to complete. The skipping includes discarding, from the transaction log, one or more entries related to the earliest open transaction, and identifying, in the transaction log, a next earliest open transaction.

20 Claims, 4 Drawing Sheets

Related U.S. Application Data continuation of application No. 15/281,607, filed on Sep. 30, 2016, now Pat. No. 10,534,675.

(51) Int. Cl.
    *G06F 21/60*     (2013.01)
    *G06F 16/27*     (2019.01)
    *G06F 16/23*     (2019.01)
    *G06F 21/62*     (2013.01)

(52) U.S. Cl.
    CPC .......... *G06F 16/2379* (2019.01); *G06F 16/27* (2019.01); *G06F 16/273* (2019.01); *G06F 21/604* (2013.01); *G06F 21/6227* (2013.01); *G06F 2201/80* (2013.01)

(56) References Cited

U.S. PATENT DOCUMENTS

| | | | |
|---|---|---|---|
| 7,062,563 B1* | 6/2006 | Lewis | H04L 61/1523 709/227 |
| 7,865,959 B1* | 1/2011 | Lewis | G06F 21/6218 726/26 |
| 8,666,942 B2 | 3/2014 | Ngo | |
| 9,244,775 B2 | 1/2016 | Koza | |
| 9,244,776 B2 | 1/2016 | Koza | |
| 9,922,074 B1* | 3/2018 | Hoffmann | G06F 16/2379 |
| 10,198,328 B2 | 2/2019 | Kedia | |
| 2003/0005120 A1* | 1/2003 | Mutalik | G06F 11/1469 709/225 |
| 2003/0105732 A1* | 6/2003 | Kagalwala | G06F 16/211 |
| 2005/0021567 A1 | 1/2005 | Holenstein | |
| 2005/0060342 A1* | 3/2005 | Farag | G06F 16/252 |
| 2005/0114285 A1 | 5/2005 | Cincotta | |
| 2006/0190497 A1 | 8/2006 | Inturi | |
| 2006/0200507 A1* | 9/2006 | Holenstein | G06F 16/273 |
| 2008/0033960 A1* | 2/2008 | Banks | G06F 16/242 |
| 2008/0168135 A1* | 7/2008 | Redlich | G06F 21/6218 709/204 |
| 2009/0254572 A1* | 10/2009 | Redlich | G06Q 10/06 |
| 2012/0150803 A1 | 6/2012 | Zhu | |
| 2013/0124473 A1* | 5/2013 | Gutberlet | G06F 16/273 707/634 |
| 2015/0032689 A1 | 1/2015 | Raghunathan | |
| 2015/0113614 A1 | 4/2015 | Sarkuni | |
| 2015/0301910 A1 | 10/2015 | Sathyanarayana | |
| 2016/0019252 A1 | 1/2016 | Ducott, III | |
| 2018/0095841 A1 | 4/2018 | Kedia | |
| 2018/0095842 A1 | 4/2018 | Kedia | |
| 2018/0095843 A1 | 4/2018 | Kedia | |
| 2018/0322184 A1 | 11/2018 | Voss | |

\* cited by examiner

ACL BASED OPEN TRANSACTIONS IN REPLICATION ENVIRONMENT

BACKGROUND

The present invention relates generally to the field of data replication, and more particularly to the handling of open transactions in a data replication environment.

In today's competitive IT markets, many companies have data replication tools to replicate data from a source database to one or more target databases on a close to real time basis. One type of database system that is frequently backed up is a relational database management system (RDBMS). A RDBMS is a program that lets you create, update, and administer a relational database. An RDBMS is also the basis for structured query language (SQL).

In a RDBMS, a transaction log, also referred to as a transaction journal, database log, binary log or audit trail, is a history of actions executed by a database management system to guarantee transaction properties over crashes or hardware failures. Stated another way, a transaction log is a file that lists changes to the database and is stored in a stable storage format.

A data definition language, also referred to as data description language (DDL), is a syntax similar to a computer programming language for defining data structures, and is typically used in database schemas. Examples of DDL commands or operations are CREATE, ALTER, DROP, TRUNCATE COMMENT, and RENAME.

A data manipulation language (DML) is a family of syntax elements similar to a computer programming language used for selecting, inserting, deleting and updating data in a relational database. SQL is one popular data manipulation language that is used to retrieve and manipulate data in a relational database. Examples of DML commands or operations are SELECT, INSERT, UPDATE, MERGE and DELETE.

SUMMARY

Embodiments of the present invention disclose a method, computer program product, and system for handling open transactions in a data replication environment. The method includes receiving, in a data replication system where data is being replicated from a source database to a target database, a transaction log identifying a plurality of open transactions for which the data replication system is waiting to complete before replicating to the target database. The method further includes determining a database user that initiated a first open transaction, where the first open transaction is an earliest open transaction in the transaction log. The method further includes, upon determining that the database user does not have access privileges for one or more tables of the target database corresponding to one or more tables of the source database associated with the first open transaction, skipping replication of the first open transaction to the target database, such that the data replication system no longer waits for the first open transaction to complete. The skipping includes discarding, from the transaction log, one or more entries related to the first open transaction, and identifying, in the transaction log, a second open transaction as a next earliest open transaction. The method further includes, upon determining that the database user has access privileges to one or more tables of the target database corresponding to one or more tables of the source database associated with the second open transaction, replicating the second open transaction to the target database once the second open transaction completes.

DETAILED DESCRIPTION

Figure 1:
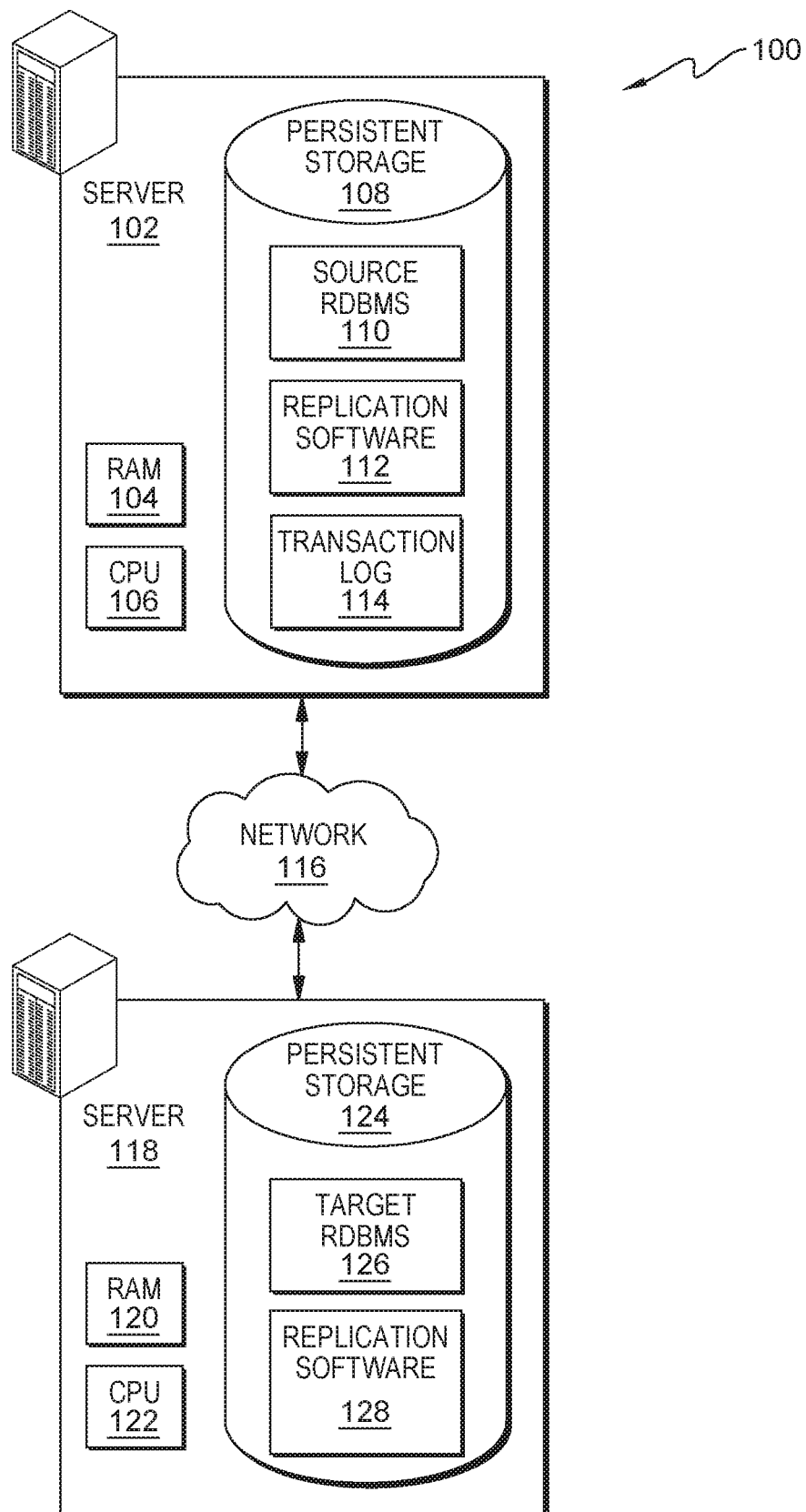
FIG. 1 is a functional block diagram illustrating a data replication environment, in an embodiment in accordance with the present invention.

In typical data replication environments, open transaction logs are used to keep track of transactions that need to complete before they can be replicated. However, not all open transactions are relevant, or contextual, to replication. Embodiments in accordance with the present invention provide data replication software the ability to dynamically skip/ignore open transactions which are not contextual to data replication and move to a next contextual open transaction.

In a data replication environment, replication software may track the progress of all transactions that have been applied to a target RDBMS using a source transaction log. If a transaction is not committed on the source RDBMS (and therefore also not yet applied to the target RDBMS), then that transaction is called an open transaction. When there are many open transactions, the replication software tracks the earliest such transaction (i.e., the earliest open position). From that point onward, a log reader keeps a record of the open transactions, especially the earliest open transaction, so that there is no need to continuously query the database catalog. The earliest open transaction is maintained as part of a bookmark for the source replication process. The bookmark only moves forward when the earliest open transaction is committed or rolled back on the source RDBMS. However, the earliest open transaction is at the entire database level and is not necessarily contextual to the particular replication that is taking place.

In typical data replication environments, the earliest open transaction position is required for replicating transactions from the source RDBMS to the target RDBMS, as replication tools generally only send committed transactions to the target. Some embodiments of the present invention improve the algorithm for handling open transactions by moving the earliest open transaction bookmark when the current earliest open transaction involves tables that are out of scope for replication. For example, assume there are N tables in a source database—tables T1, T2, T3 ... and Tn—and only T1 and T2 are part of the replication system. In this example, T1 and T2 are called in-scope tables because they are part of the replication system. Transactions that do not involve tables T1 and T2 would be considered out of scope, and would therefore be skipped (i.e. no longer considered "open transactions") for purposes of replication. This is an improvement over existing systems that unnecessarily keep track of transactions that are not contextual to replication.

Some embodiments of the present invention provide an access control list (ACL) based open transaction processing system that is run time capable and, based on meta data of the source RDBMS and meta data of the replication system, discards all open transactions that are not contextual for replication. Stated another way, some embodiments of the present invention provide an improved algorithm in a replication software that will only consider, or move, open transactions initiated by a database user who has a determined minimum privilege to perform at least one DML command or statement (such as an INSERT, UPDATE, and/or DELETE) against any of the tables that are part of the replication system (i.e., in-scope tables). Open transactions are discarded where privileges to in-scope tables are missing, which means the particular open transaction is not contextual to the replication system (e.g., the table is source database table T3, discussed above, for which the replication user does not have access privileges).

Current available data replication solutions in the industry capture database changes from the archive/transaction log as they happen and deliver them to target databases. When an open transaction which is non-contextual to replication is present against the source database, IT administrators are not able to archive, release and/or backup the transaction logs unless the transaction logs are forcefully retained.

In some embodiments, replication software will wait until a transaction has been open for a certain amount of time before determining whether that transaction's database user has the proper user privileges. For example, if a particular INSERT, UPDATE, and/or DELETE DML transaction has been open for more than two hours, and the ACL privileges for that transaction against any of the source tables are missing, that particular DML transaction can be identified as non-contextual and can then be skipped or ignored without any manual intervention. The replication software will then try to find a next contextual ACL-based open transaction.

Some embodiments of the present invention can be applied to heterogeneous source databases. In other words, some embodiments monitor open transactions from multiple source databases and/or database management systems, allowing for the unified processing of open transactions.

If the transaction is open (not committed or rolled back until now) then the replication software will keep on asking for the source database to provide the old database log files to restart the scrapping from this same earliest open transaction position. Some embodiments of the present invention improve the algorithm by not considering a transaction open if it has already determined, based on the ACL dictionary, that the user does not have privilege to initiate, or perform, the INSERT, UPDATE, and/or DELETE DML on the target (i.e., in-scope) tables and therefore, move the earliest open transaction forward until the replication software finds a transaction that has the proper privilege on the in-scope tables.

Embodiments in accordance with the present invention will now be described in detail with reference to the Figures. FIG. 1 is a functional block diagram, generally designated 100, illustrating a data replication environment, in an embodiment in accordance with the present invention.

Data replication environment 100 includes server 102, server 118, and other computing devices (not shown), all interconnected over network 116. Server 102 includes random access memory (RAM) 104, central processing unit (CPU) 106, and persistent storage 108. Server 102 may be a Web server, or any other electronic device or computing system, capable of processing program instructions and receiving and sending data. In some embodiments, server 102 may be a laptop computer, a tablet computer, a netbook computer, a personal computer (PC), a desktop computer, a personal digital assistant (PDA), a smart phone, or any programmable electronic device capable of communicating over a data connection to network 116. In other embodiments, server 102 may represent server computing systems utilizing multiple computers as a server system, such as in a distributed computing environment. In general, server 102 is representative of any electronic device or combinations of electronic devices capable of executing machine-readable program instructions and communicating with server 118 via network 116 and with various components and devices (not shown) within data replication environment 100.

Server 102 includes persistent storage 108. Persistent storage 108 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer-readable storage medium that is capable of storing program instructions or digital information. Source RDBMS 110, replication software 112, and transaction log 114 are stored in persistent storage 108, which also includes operating system software (not shown), as well as software that enables server 102 to communicate with server 118 and other computing devices (not shown) of data replication environment 100 over a data connection on network 116. In other example embodiments, source RDBMS 110, replication software 112 and transaction log 114 may be components of an operating system software.

Source RDBMS 110 is a computer program, or set of computer programs, that is stored in persistent storage 108. Source RDBMS 110 enables a user to create, update, and administer a relational database. A relational database is a collection of data items organized as a set of formally-described tables from which data can be accessed or reassembled in many different ways without having to reorganize the database tables. A relational database is a set of tables containing data fitted into predefined categories. Each table, also referred to as a "relation", contains one or more data categories in columns. Each row contains a unique instance of data for the categories defined by the columns. For example, a business order entry database can include a table that describes a customer with columns for a name, an address, a phone number, and so forth. Another table would describe an order with columns for a product, a customer, a date, a sale price, and so forth. A user of the database could obtain a "view" of the database that fitted the user's needs. For example, a branch office manager might like a view or report on all customers that had bought products on a certain date. A financial services manager in the same company could, from the same tables, obtain a report on accounts that needed to be paid.

Replication software 112 is a computer program, or set of computer programs, that is stored in persistent storage 108. Replication software 112 enables a user to copy data from source RDBMS 110 on server 102, to target RDBMS 126 on server 118 so that all users can share the same level of information. The replication of source RDBMS 110 results is a distributed database in which users can access data relevant to their tasks without interfering with the work of others. Replication software 112 provides a processor-implemented method for determining open transactions of the source replication agent against source RDBMS 110 using the privileges assigned on in-scope tables for database users in data replication environment 100, wherein data is being replicated from source RDBMS 110 to target RDBMS 126. In a data replication phase, replication software 112 scrapes the transaction log of source RDBMS 110, and maintains a bookmark of values which are established by a replication log reader process. Data scraping is a technique in which a computer program extracts data from human-readable output coming from another program. Upon starting a replication process for a first time, current replication software methods determine the earliest open position (i.e., earliest open transaction), by querying source RDBMS 110 continuously. In the present embodiment, the replication log reader keeps a record of all open transactions, especially the earliest open transaction, therefore reducing the need to continuously query the database catalog. Transaction log 114 provides the replication software 112 with information about new open transactions against source RDBMS 110 along with information relating to the user who performed the transaction. In other example embodiments, replication software 112 may be contained and executed on server 118 or on other computing devices (not shown) within data replication environment 100.

Transaction log 114 is used by replication software 112 to track all open transactions to source RDBMS 110. Transaction log 114 is a history of actions executed by RDBMS 110 to guarantee transaction properties over crashes or hardware failures. During the replication process, transaction log 114 provides replication software 112 with information about new transactions open against the source database (e.g., source RDBMS 110), along with which database user opened the transaction. Transaction log 114 can be a physical log file that lists changes to the database, and stored in a stable storage format in persistent storage 108. In other example embodiments, transaction log 114 can be stored on other computing devices (not shown) within data replication environment 100.

Figure 4:
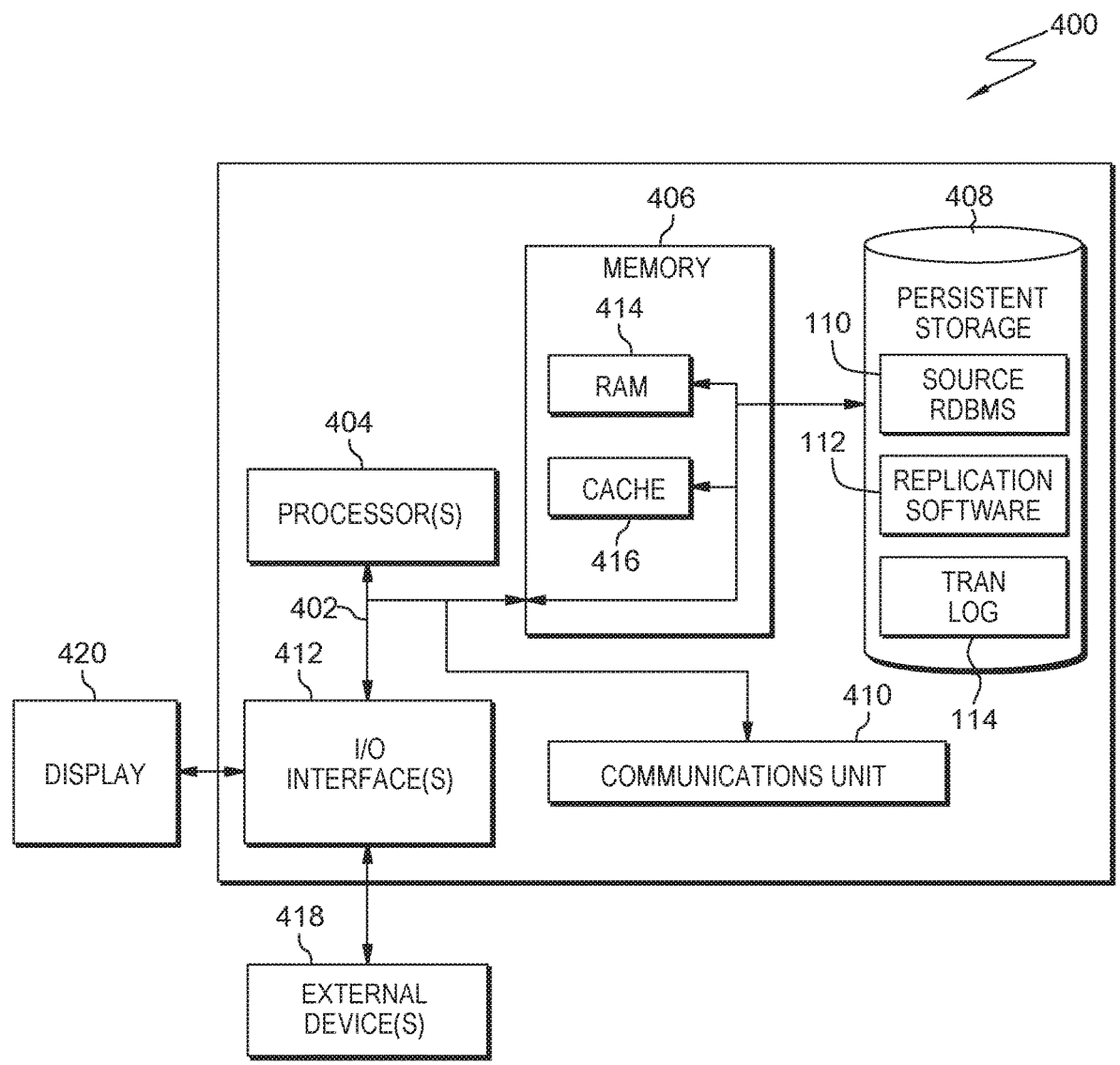
FIG. 4 depicts a block diagram of components of the server computer executing the replication software, in an embodiment in accordance with the present invention.

Server 102 may include internal and external hardware components, as depicted and described in further detail with respect to FIG. 4.

In FIG. 1, network 116 is shown as the interconnecting fabric between server 102, server 118, and with various components and devices (not shown) within data replication environment 100. In practice, the connection may be any viable data transport network, such as, for example, a LAN or WAN. Network 116 can be for example, a local area network (LAN), a wide area network (WAN) such as the Internet, or a combination of the two, and include wired, wireless, or fiber optic connections. In general, network 116 can be any combination of connections and protocols that will support communications between server 102, server 118, and with various components and devices (not shown) within data replication environment 100.

Server 118 is included in data replication environment 100. Server 118 includes random access memory (RAM) 120, central processing unit (CPU) 122, and persistent storage 124. Server 118 may be a Web server, or any other electronic device or computing system, capable of processing program instructions and receiving and sending data. In some embodiments, server 118 may be a laptop computer, a tablet computer, a netbook computer, a personal computer (PC), a desktop computer, a personal digital assistant (PDA), a smart phone, or any programmable electronic device capable of communicating over a data connection to network 116. In other embodiments, server 118 may represent server computing systems utilizing multiple computers as a server system, such as in a distributed computing environment. In general, server 118 is representative of any electronic devices or combinations of electronic devices capable of executing machine-readable program instructions and communicating with server 102 via network 116 and with various components and devices (not shown) within data replication environment 100.

Server 118 includes persistent storage 124. Persistent storage 124 may, for example, be a hard disk drive. Alternatively, or in addition to a magnetic hard disk drive, persistent storage 124 may include a solid state hard drive, a semiconductor storage device, read-only memory (ROM), erasable programmable read-only memory (EPROM), flash memory, or any other computer-readable storage medium that is capable of storing program instructions or digital information. Target RDBMS 126 and replication software 128 are stored in persistent storage 124, which also includes operating system software, as well as software that enables server 118 to detect and establish a connection to server 102, and communicate with other computing devices (not shown) of data replication environment 100 over a data connection on network 116.

Target RDBMS 126 is a computer program, or set of computer program, that is stored in persistent storage 124. In this example embodiment, target RDBMS 126 is a replication of source RDBMS 110. In other example embodiments, source RDBMS 110 may be replicated to more than one computing device (e.g., server 118), within data replication environment 100.

Replication software 128 is a computer program, or set of computer programs, that is stored in persistent storage 124. Replication software 128 enables a user to copy data from source RDBMS 110 on server 102, to target RDBMS on server 118 so that all users can share the same level of information. In other example embodiments, replication software 128 can replicate data from target RDBMS 126 to one or more computing devices within data replication environment 100.

Figure 2:
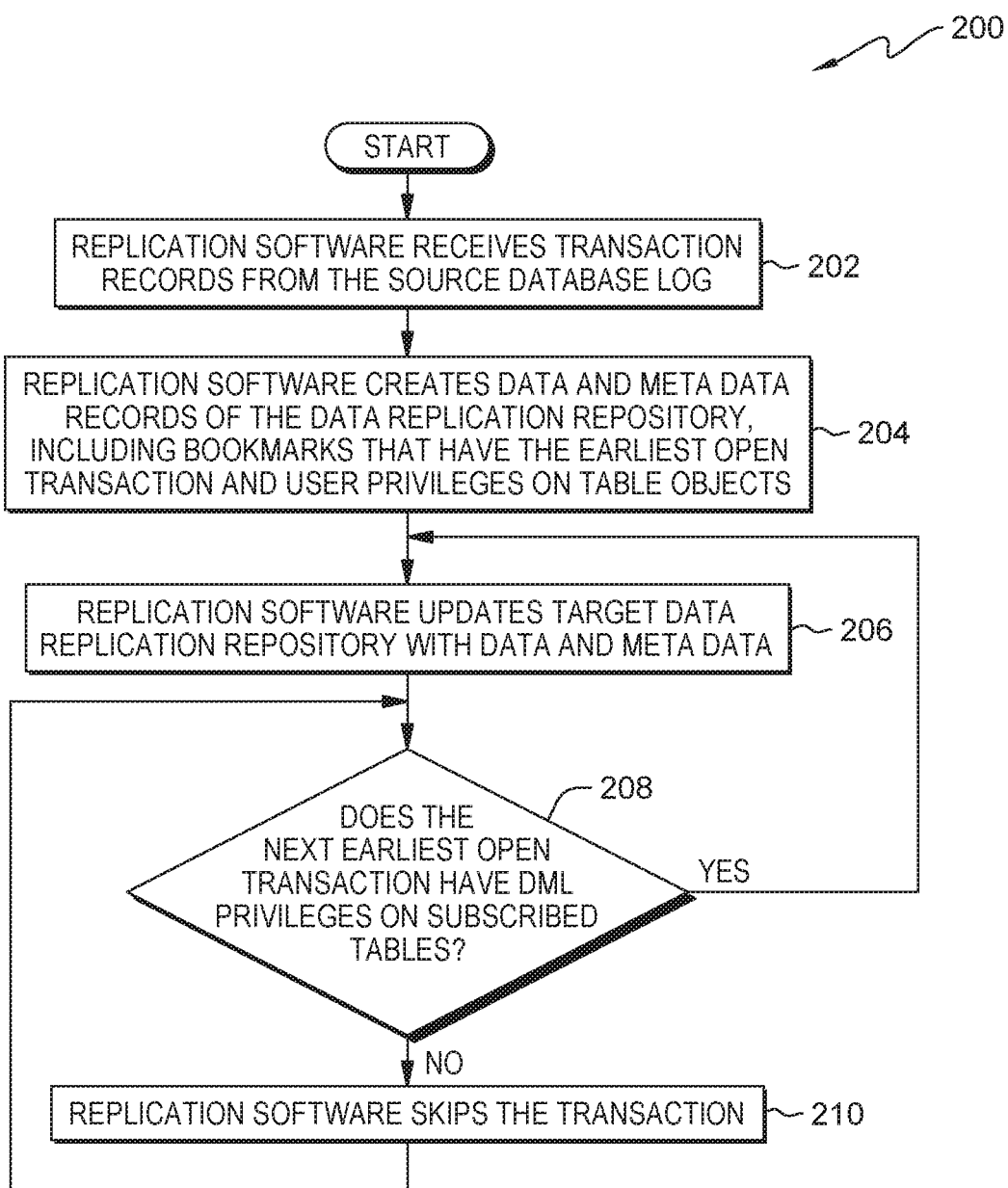
FIG. 2 is a flowchart depicting operational steps of a replication software, on a server computer within the data replication environment of FIG. 1, in an embodiment in accordance with the present invention.

FIG. 2 is a flowchart, generally designated 200, depicting operational steps of a replication software, on a server computer within the data replication environment of FIG. 1, in an embodiment in accordance with the present invention. In an example embodiment, during a replication process replication software 112 receives one or more transaction records from the source RDBMS 110 transaction log 114 as depicted in step 202. For example, replication software 112 determines if there are any current open transactions by checking transaction log 114. Transaction log 114 contains information pertaining to open transactions on source RDBMS 110, including information pertaining to the database user that opened the transaction. In the current example embodiment, transaction log 114 can be internal to source RDBMS 110. In other example embodiments, transaction log 114 can be external to source RDBMS 110.

In step 204, replication software 112 creates data and meta data records of the data replication repository including bookmarks that have the earliest open transaction and user privileges on table objects. For example, replication software 112 can create and maintain information about the object privileges of each database user (e.g., the set of tables for which the user can make DML changes) by querying the source RDBMS 110 or obtaining information from transaction log 114 and creating the meta data records. In some example embodiments, this information will be obtained by querying the source RDBMS 110 meta data. In the current example embodiment, the information may be refreshed occasionally based on a time period or the source RDBMS 110 administrator may trigger a refresh when object privilege changes are made. In other example embodiments, the information about object privileges can be obtained from transaction log 114.

Replication software 112 updates data replication repository with data and meta data as depicted in step 206. For example, replication software copies data and meta data to target RDBMS 126. In other example embodiments, there may be more than one target database in the scope of the replication process.

In decision step 208, replication software 112 determines if the user that initiated the next earliest open transaction has the required DML privileges on the subscribed (i.e., configured for replication) tables. For example, replication software 112 determines if the user has the minimum ACL privileges required to perform the transaction (e.g., INSERT, UPDATE, DELETE) on the identified tables configured for replication (i.e., in-scope tables). If replication software 112 determines that the user that initiated the next earliest open transaction has DML privileges on subscribed tables ("Yes" branch, decision 208), replication software 112 repeats step 206 as depicted in FIG. 2. For example, replication software 112 determines that the user that initiated the next earliest open transaction has authority to perform a select, insert, delete and/or update to the data for one or more subscribed tables, replication software will update target RDBMS 126 with copied data and meta data from source RDBMS 110 once the transaction completes. Replication software 110 determines the ACL privileges of the user by querying source RDBMS 110.

If replication software 112 determines that the next earliest open transaction does not have DML privileges on subscribed tables ("No" branch, decision 208), replication software 112 skips the transaction as depicted in step 210. For example, while replicating source RDBMS 110 to target RDBMS 126, transaction log 114 provides the replication software 112 with information about new transactions open against source RDBMS 110 along with which database user opened the transaction. Replication software 112 will then determine whether the user who initiated the transaction has the ability, or authority, to make changes (e.g., INSERT, UPDATE, DELETE), to any of the tables in the scope of the replication process. If the user does not have the authority to make changes to any of the tables, then replication software 112 can ignore the transaction, discarding all the transaction log 114 entries related to the open transaction and look for a next open transaction. The open transactions are maintained by the bookmarks by the source replication process (e.g., replication software 112). The bookmarks only move forward until the earliest open transaction is committed or rolled back on the source database (e.g., source RDBMS 110. Replication software 112 can ignore transactions that occur in normal situations when first starting a replication process. For example, replication software can ignore normal transactions (e.g., INSERT, UPDATE, DELETE statements along with GRANT, REVOKE and other DDL commands such as Alter table), that are not within the scope of the replication process, or do not have to proper privileges.

Figure 3:
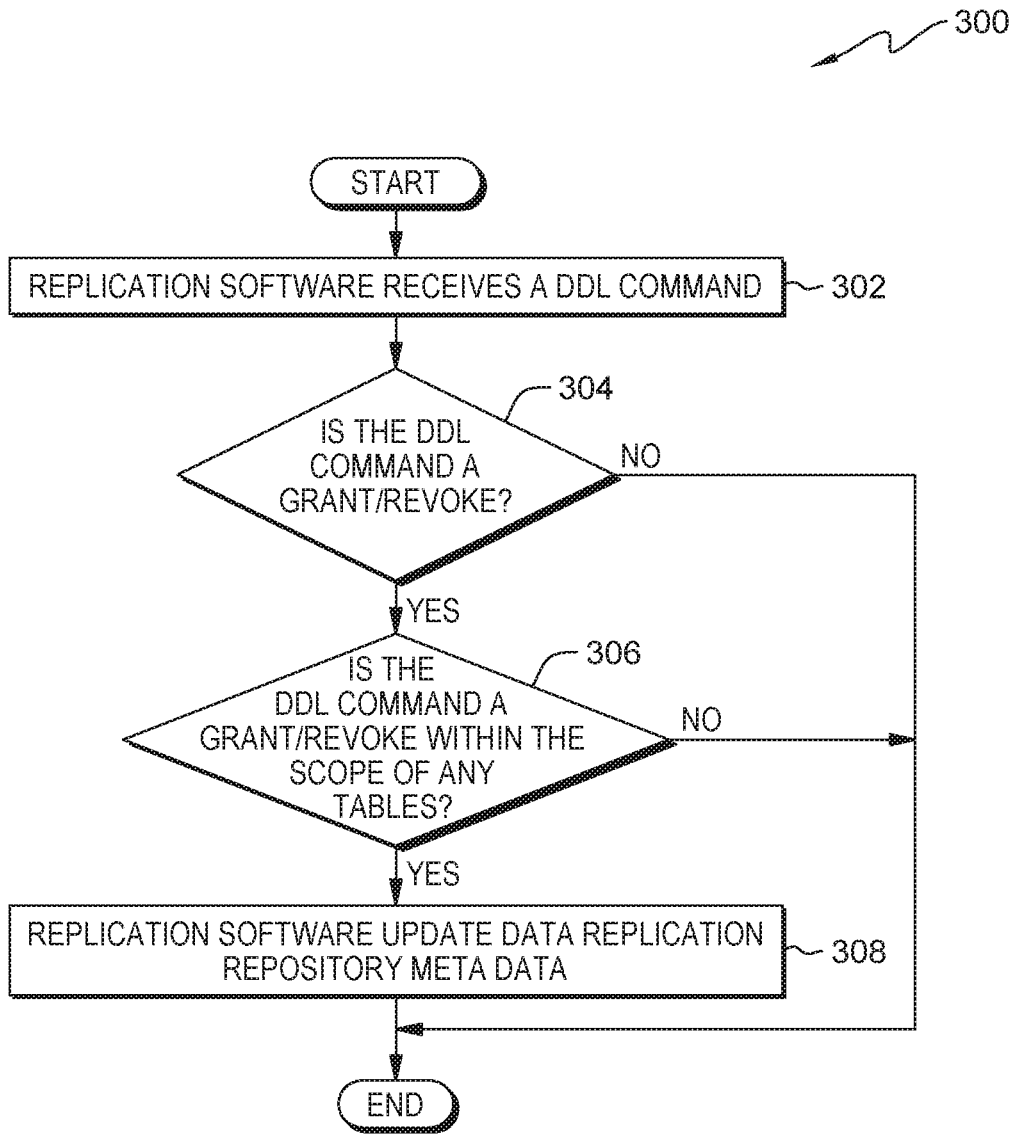
FIG. 3 is a flowchart depicting operational steps of a replication software, on a server computer within the data replication environment of FIG. 1, in an embodiment in accordance with the present invention.

FIG. 3 is a flowchart, generally designated 300, depicting operational steps of a replication software, on a server computer within the data replication environment of FIG. 1, in an embodiment in accordance with the present invention. In this example embodiment, replication software checks open DDL commands to determine whether they affect user DML privileges and, if so, updates data replication repository meta data accordingly. In doing this, data replication software can keep user privilege data up-to-date during a replication process, allowing for accurate skipping of non-contextual open transactions (such as that depicted in step 210 of FIG. 2) in real time.

Replication software 112 receives a DDL command (i.e. an open transaction) from a source database transaction log, as depicted in step 302. For example, replication software 112 can receive a CREATE, ALTER, DROP, TRUNCATE COMMENT, RENAME, GRANT, or REVOKE command.

In decision step 304, replication software 112 determines if the DDL command is a GRANT or REVOKE command—i.e. a command which can change user privileges. If replication software 112 determines that the DDL command is not a GRANT or REVOKE transaction ("No" branch, decision 304), replication software 112 skips the transaction and processing completes as depicted in FIG. 3. If replication software 112 determines that the DDL command is a GRANT or REVOKE transaction ("Yes" branch, decision 304), replication software 112 then determines if the GRANT or REVOKE transaction is in the scope for any tables in the replication process.

In decision step 306, replication software 112 determines if the DDL command is a GRANT or REVOKE transaction that is within the scope of any tables in the replication process. If replication software 112 determines that the DDL command is not a GRANT or REVOKE transaction within the scope for any tables in the replication process, ("No" branch, decision 306), replication software 112 skips the transaction and processing completes as depicted in FIG. 3. If replication software 112 determines that the DDL command is a grant or revoke transaction that is in the scope for any tables in the replication process, ("Yes" branch, decision 306), replication software 112 updates target RBDMS 126 with data and meta data—including the updated user privilege data—from source RDBMS 110 as depicted in step 308. In doing so, replication software 112 keeps user privilege data up-to-date during the replication process, allowing for accurate skipping of subsequent non-contextual open transactions in real time.

Some embodiments of the present invention provide the following features, advantages, and/or characteristics: (i) an improved backup and/or management of transaction log 114 of source RDBMS 110, because replication software 112 does not need to unnecessarily track the transaction logs on source RDBMS 110, (ii) an improved management of bookmarks, especially of the restart position, because there is no need to go back to older transactions that were not in scope based on the ACL privileges, (iii) an optimal usage of a replication disk repository, (iv) an improved target database latency reporting, (v) an optimal usage of data replication memory, (vi) an improved source engine throughput, and (vii) an improved throughput of the replication pipeline from source RDBMS 110 to target RDBMS 126.

FIG. 4 depicts a block diagram, generally designated 400, of components of the server computer executing the replication software, in an embodiment in accordance with the present invention. It should be appreciated that FIG. 4 provides only an illustration of one implementation and does not imply any limitations with regard to the environments in which different embodiments may be implemented. Many modifications to the depicted environment may be made.

Server computer 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Source RDBMS 110, replication software 112, and transaction log 114 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of network 116 and server 118. In these examples, communications unit 410 includes one or more network interface cards. Communications unit 410 may provide communications through the use of either or both physical and wireless communications links. Source RDBMS 110, replication software 112, and transaction log 114 may be downloaded to persistent storage 408 through communications unit 410.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., source RDBMS 110, replication software 112, and transaction log 114, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

What is claimed is:

1. A computer-implemented method comprising:
   receiving, by one or more processors, in a data replication system where data is being replicated from a source database to a target database, a transaction log identifying a plurality of open transactions for which the data replication system is waiting to complete before replicating to the target database;

determining, by one or more computer processors, a database user that initiated a first open transaction, wherein the first open transaction is an earliest open transaction in the transaction log;

upon determining that the database user does not have access privileges for one or more tables of the target database corresponding to one or more tables of the source database associated with the first open transaction, skipping, by one or more computer processors, replication of the first open transaction to the target database, such that the data replication system no longer waits for the first open transaction to complete, wherein the skipping includes discarding, from the transaction log, one or more entries related to the first open transaction, and identifying, in the transaction log, a second open transaction as a next earliest open transaction; and upon determining that the database user has access privileges to one or more tables of the target database corresponding to one or more tables of the source database associated with the second open transaction, replicating, by one or more computer processors, the second open transaction to the target database once the second open transaction completes.

2. The computer-implemented method of claim 1, wherein the second open transaction completes either when the second open transaction commits on the source database or when the second open transaction fails.

3. The computer-implemented method of claim 2, wherein database user access privileges are stored in meta data of the data replication system.

4. The computer-implemented method of claim 3, further comprising:

determining, by one or more computer processors, that the second open transaction includes a command that alters user privileges; and in response to determining that the second open transaction includes a command that alters user privileges, and in response to replicating the second open transaction to the target database, updating, by one or more computer processors, the meta data of the data replication system to reflect the user privileges altered by the second open transaction.

5. The computer-implemented method of claim 1, wherein the first open transaction is one of the following:

an insert command;

an update command; or a delete command.

6. The computer-implemented method of claim 1, wherein the determining that the database user does not have access privileges for the one or more tables of the target database corresponding to the one or more tables of the source database associated with the first open transaction is based, at least in part, on a query of the target database.

7. The computer-implemented method of claim 1, wherein the discarded one or more entries related to the first open transaction include all of the entries related to the first open transaction in the transaction log.

8. A computer program product comprising:

one or more computer readable storage media and program instructions stored on the one or more computer readable storage media, the stored program instructions comprising:

program instructions to receive, in a data replication system where data is being replicated from a source database to a target database, a transaction log identifying a plurality of open transactions for which the data replication system is waiting to complete before replicating to the target database;

program instructions to determine a database user that initiated a first open transaction, wherein the first open transaction is an earliest open transaction in the transaction log;

program instructions to, upon determining that the database user does not have access privileges for one or more tables of the target database corresponding to one or more tables of the source database associated with the first open transaction, skip replication of the first open transaction to the target database, such that the data replication system no longer waits for the first open transaction to complete, wherein the skipping includes discarding, from the transaction log, one or more entries related to the first open transaction, and identifying, in the transaction log, a second open transaction as a next earliest open transaction; and program instructions to, upon determining that the database user has access privileges to one or more tables of the target database corresponding to one or more tables of the source database associated with the second open transaction, replicate the second open transaction to the target database once the second open transaction completes.

9. The computer program product of claim 8, wherein the second open transaction completes either when the second open transaction commits on the source database or when the second open transaction fails.

10. The computer program product of claim 9, wherein database user access privileges are stored in meta data of the data replication system.

11. The computer program product of claim 10, the stored program instructions further comprising:

program instructions to determine that the second open transaction includes a command that alters user privileges; and program instructions to, in response to determining that the second open transaction includes a command that alters user privileges, and in response to replicating the second open transaction to the target database, update the meta data of the data replication system to reflect the user privileges altered by the second open transaction.

12. The computer program product of claim 8, wherein the first open transaction is one of the following:

an insert command;

an update command; or a delete command.

13. The computer program product of claim 8, wherein the determining that the database user does not have access privileges for the one or more tables of the target database corresponding to the one or more tables of the source database associated with the first open transaction is based, at least in part, on a query of the target database.

14. The computer program product of claim 8, wherein the discarded one or more entries related to the first open transaction include all of the entries related to the first open transaction in the transaction log.

15. A computer system comprising:

one or more computer processors;

one or more computer readable storage media; and program instructions stored on the computer readable storage media for execution by at least one of the one or more processors, the stored program instructions comprising:
- program instructions to receive, in a data replication system where data is being replicated from a source database to a target database, a transaction log identifying a plurality of open transactions for which the data replication system is waiting to complete before replicating to the target database;
- program instructions to determine a database user that initiated a first open transaction, wherein the first open transaction is an earliest open transaction in the transaction log;
- program instructions to, upon determining that the database user does not have access privileges for one or more tables of the target database corresponding to one or more tables of the source database associated with the first open transaction, skip replication of the first open transaction to the target database, such that the data replication system no longer waits for the first open transaction to complete, wherein the skipping includes discarding, from the transaction log, one or more entries related to the first open transaction, and identifying, in the transaction log, a second open transaction as a next earliest open transaction; and
- program instructions to, upon determining that the database user has access privileges to one or more tables of the target database corresponding to one or more tables of the source database associated with the second open transaction, replicate the second open transaction to the target database once the second open transaction completes.

16. The computer system of claim 15, wherein the second open transaction completes either when the second open transaction commits on the source database or when the second open transaction fails.

17. The computer system of claim 16, wherein database user access privileges are stored in meta data of the data replication system.

18. The computer system of claim 17, the stored program instructions further comprising:
- program instructions to determine that the second open transaction includes a command that alters user privileges; and
- program instructions to, in response to determining that the second open transaction includes a command that alters user privileges, and in response to replicating the second open transaction to the target database, update the meta data of the data replication system to reflect the user privileges altered by the second open transaction.

19. The computer system of claim 15, wherein the determining that the database user does not have access privileges for the one or more tables of the target database corresponding to the one or more tables of the source database associated with the first open transaction is based, at least in part, on a query of the target database.

20. The computer system of claim 15, wherein the discarded one or more entries related to the first open transaction include all of the entries related to the first open transaction in the transaction log.

* * * * *